United States Patent
Gorman

[11] 3,785,748
[45] Jan. 15, 1974

[54] REINFORCED AUTOMOTIVE FAN

[75] Inventor: Thomas G. Gorman, Hanover, Mich.

[73] Assignee: Hayes-Albion, Jackson, Mich.

[22] Filed: Feb. 3, 1972

[21] Appl. No.: 223,179

[52] U.S. Cl.................. 416/132, 416/210, 416/240
[51] Int. Cl............................................ F04d 29/38
[58] Field of Search................... 416/132, 240, 214, 416/210

[56] References Cited
UNITED STATES PATENTS

| | | | |
|---|---|---|---|
| 794,984 | 7/1905 | Huber | 416/240 |
| 2,033,345 | 3/1936 | Lee | 416/240 X |
| 2,149,267 | 3/1939 | Bouvy et al. | 416/240 UX |
| 3,044,557 | 7/1962 | Posh | 416/132 |
| 3,289,924 | 12/1966 | Weir | 416/240 X |
| 3,594,098 | 7/1971 | Pratinidhi | 416/132 |

FOREIGN PATENTS OR APPLICATIONS 1,021,376  3/1966  Great Britain................... 416/132

Primary Examiner—Everette A. Powell, Jr.

[57] ABSTRACT

A reinforced automotive flex-fan in which both sides of the flexible blade are reinforced by a one-piece member wrapped around the radial extremity of the blade.

2 Claims, 4 Drawing Figures

PRIOR ART

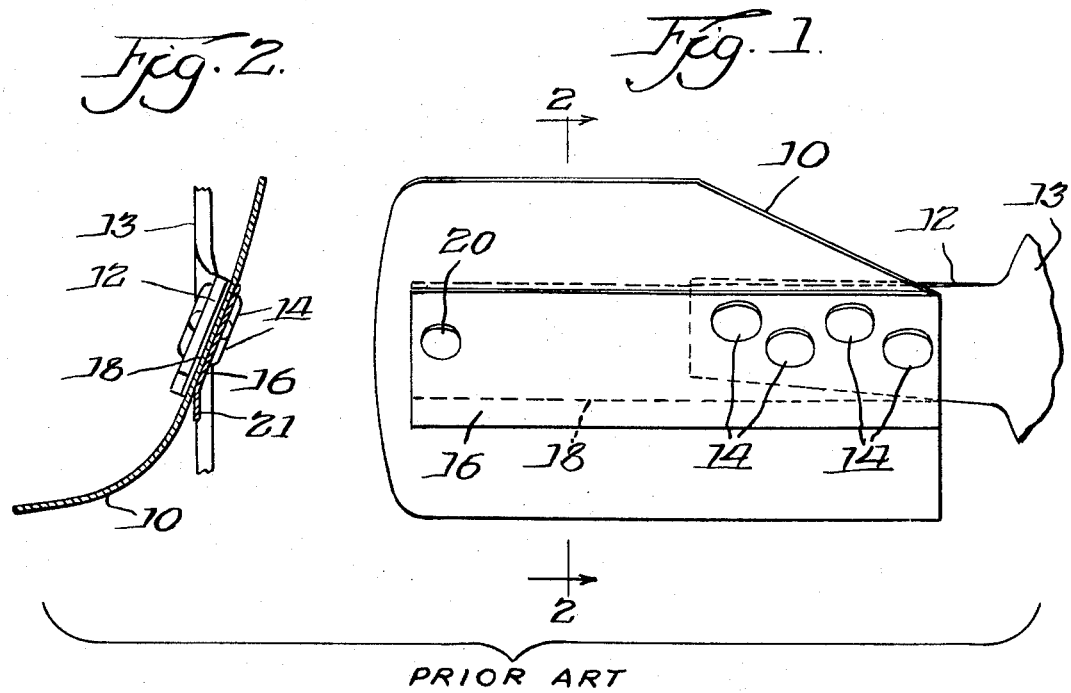
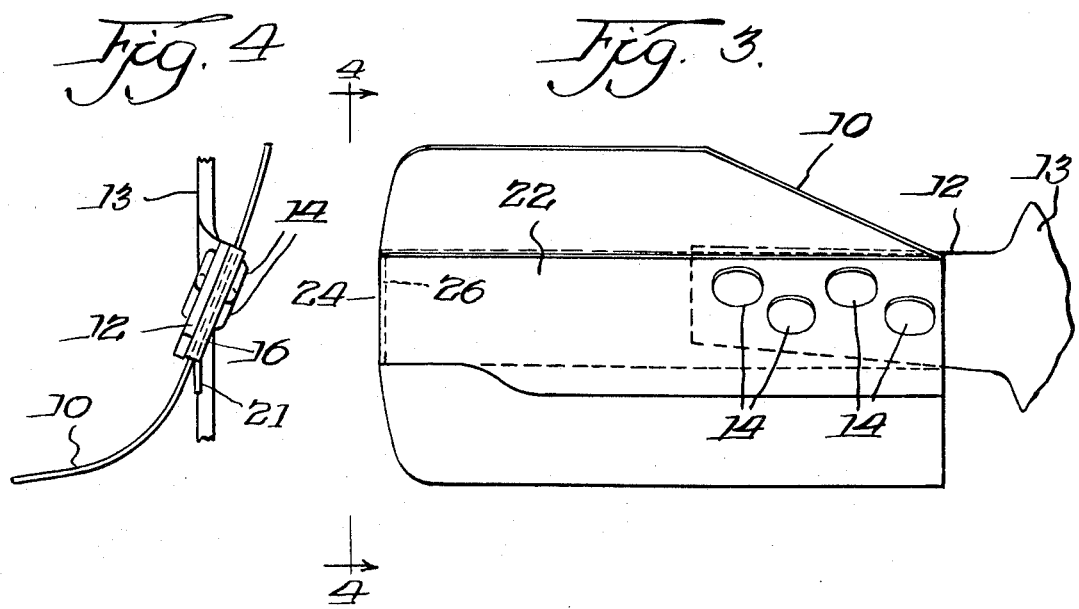

REINFORCED AUTOMOTIVE FAN

BACKGROUND OF THE INVENTION

This invention relates to the field of automotive fans. In particular, it relates to the field of automotive flex-fans. Flex-fans include curved flexible blades that decamber as the fan's rotational speed increases.

Many prior flex-fans include one or more reinforcement members which extend radially from a spider arm. Typically, the reinforcement member or members are riveted directly to the fan blade near the radial extremity thereof to prevent the reinforcement or reinforcements from vibrating.

SUMMARY OF THE INVENTION

This invention presents a unitary reinforcement member which reinforces both the forward and rearward side of the flexible blade. The reinforcement member is riveted with the blade to a spider arm and is wrapped around the radial extremity of the blade. The one-piece construction of this reinforcement member eliminates the need for a rivet or other fastening means near the radial extremity of the blade. Additionally, it eliminates the handling problems inherent in assembling fans which included multiple reinforcement members.

BRIEF DESCRIPTION OF THE DRAWINGS

The features of this invention will become more apparent in the following description read in conjunction with the Figures in which:

FIG. 1 is a front view of a prior art reinforced fan blade.

FIG. 2 is a cross sectional view of FIG. 1 taken along line 2—2 and looking in the direction of the arrows.

FIG. 3 is a front view of a reinforced fan blade constructed in accordance with the principles of this invention.

FIG. 4 is an end view of FIG. 3 taken along line 4—4 looking in the direction of the arrows.

DETAILED DESCRIPTION OF THE PREFERRED EMBODIMENT

Referring to the Figures, in which like reference numerals indicate like parts, a prior art reinforced fan blade is illustrated in FIGS. 1 and 2. A curved flexible blade 10 is mounted to a spider arm 12 by a plurality of rivets 14. The spider arm 12 emanates radially from a central hub 13 and as is well known in the art a plurality of such spider arms 12 would generally be included in a automotive fan. However, an entire fan has not been illustrated because it is unnecessary for an understanding of the principles of this invention.

The fan blade 10 is reinforced by a front member 16 and a rear member 18 disposed on opposite sides of the blade 10. A rivet 20 clamps the reinforcement members 16, 18 and the blade 10 together near the radial extremity of the blade 10 to prevent vibration.

Referring now to FIGS. 3 and 4, a curved flexible blade 10 is mounted to a spider arm 12 by a plurality of rivets 14. The front reinforcement member 16 may or may not include a portion 21 which prevents the blade 10 from bending beyond the plane of rotation of the hub. A one-piece reinforcement member 22 is mounted to the arm 12 by the rivets 14. The reinforcement member 22 is wrapped around the radial extremity of the blade 10 at 24. A notch 26 may be formed in the blade to receive the reinforcement member 22 such that it is flush with the end of the blade.

The one piece reinforcement member 22 eliminates the need for an outer rivet 20 as shown in FIGS. 1 and 2. It also combines reinforcement members 16 and 18 into a single piece which promotes ease of assembly and handling.

What is claimed is:

1. In an automotive fan of the type having flexible blades mounted to spider arms emanating from a central hub the improvement comprising a one-piece reinforcement member disposed on both sides of each flexible blade, said reinforcement member being wrapped around the radial extremity of said blade and being mounted with said blade to one of the spider arms.

2. The improvement set forth in claim 1 wherein the radial extremity of said blade is notched to receive said reinforcement member.